United States Patent [19]

Robison

[11] 3,940,337

[45] Feb. 24, 1976

[54] HORIZONTAL FLOW CLARIFIER
[75] Inventor: Herbert D. Robison, Norwood, Mass.
[73] Assignee: Ecodyne Corporation, Lincolnshire, Ill.
[22] Filed: Nov. 18, 1974
[21] Appl. No.: 524,606

Related U.S. Application Data
[63] Continuation of Ser. No. 347,031, April 2, 1973, abandoned.

[52] U.S. Cl. .................. 210/197; 210/83; 210/261; 210/535; 210/536
[51] Int. Cl.² ......................................... B01D 21/24
[58] Field of Search ........... 210/4, 83, 84, 194, 197, 210/207, 152, 261, 262, 263, 264, 521, 522, 527, 534–536, 540

[56] References Cited
UNITED STATES PATENTS

| | | | |
|---|---|---|---|
| 1,123,320 | 1/1915 | Kusch | 210/264 X |
| 1,207,621 | 12/1916 | Potter | 210/4 |
| 2,118,157 | 5/1938 | Camp | 210/83 |
| 2,889,929 | 6/1959 | Kivell | 210/261 X |
| 3,346,122 | 10/1967 | Cornelissen | 210/522 |

Primary Examiner—Charles N. Hart
Assistant Examiner—Robert G. Mukai
Attorney, Agent, or Firm—Joel E. Siegel

[57] ABSTRACT

A clarifier for purifying liquids containing solids or contaminants. The liquid to be treated enters the clarifier and is directed into a primary sludge contact zone where it is mixed with recirculating sludge. Liquid from the primary sludge contact zone is pumped via flumes to the entrance of a settling corridor for horizontal flow therethrough. The liquid flows through the corridor forming an upper free-fall zone and a lower sludge zone as the precipitates settle out. As the liquid reaches the settling corridor exit, it approaches a point of positive separation of the clarified liquid above from the sludge stream below, which is formed by the kinetic capture of precipitates settling from the free-fall zone into the sludge zone of increasing velocity. The clarified liquid and the sludge stream enter a separation zone where they are caused to contact a vertical flow directing partition wall causing the sludge stream, of higher velocity, to pass thereunder back into the primary contact zone and the clarified liquid, of lower velocity, to pass thereover to be boosted through flumes into a secondary settling basin for polishing. Polished liquid then flows over weirs to outlet while the sludge collected in the basin is directed to the entrance of the settling corridor.

11 Claims, 7 Drawing Figures

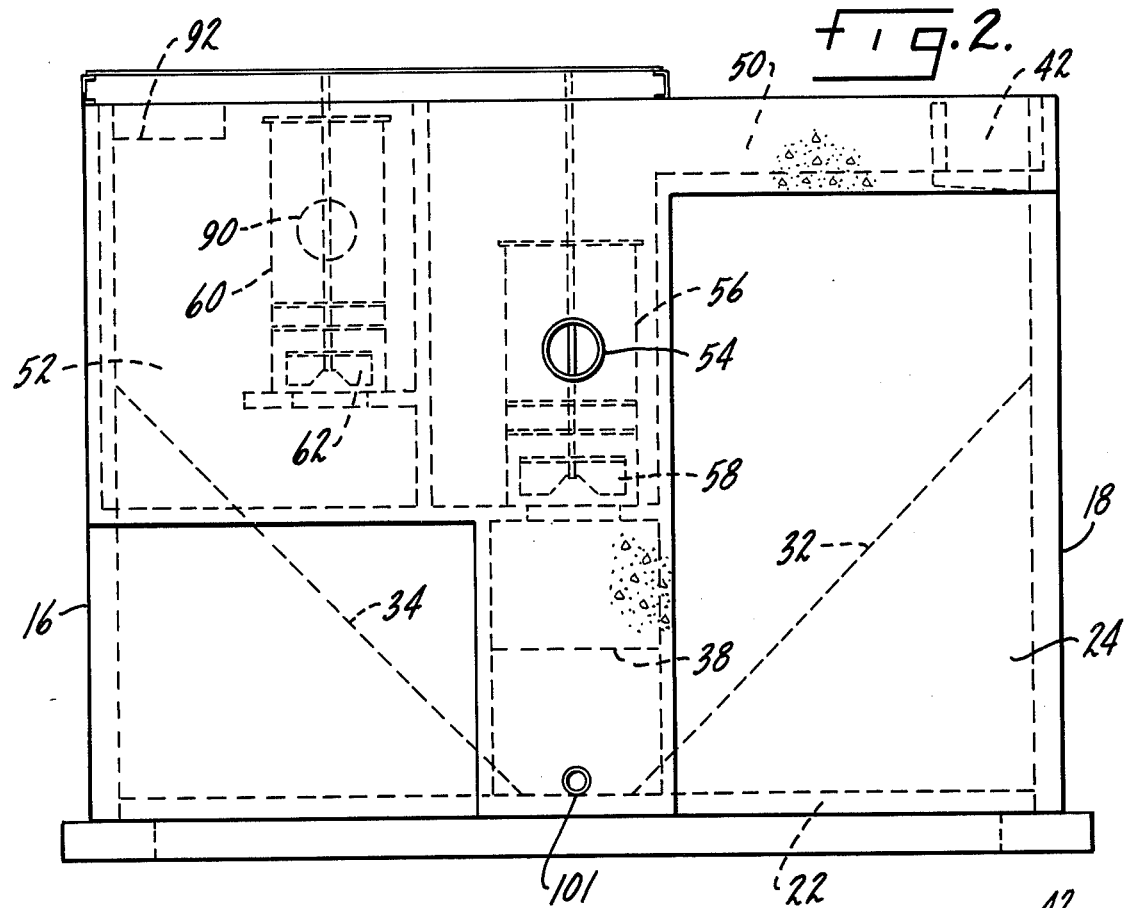
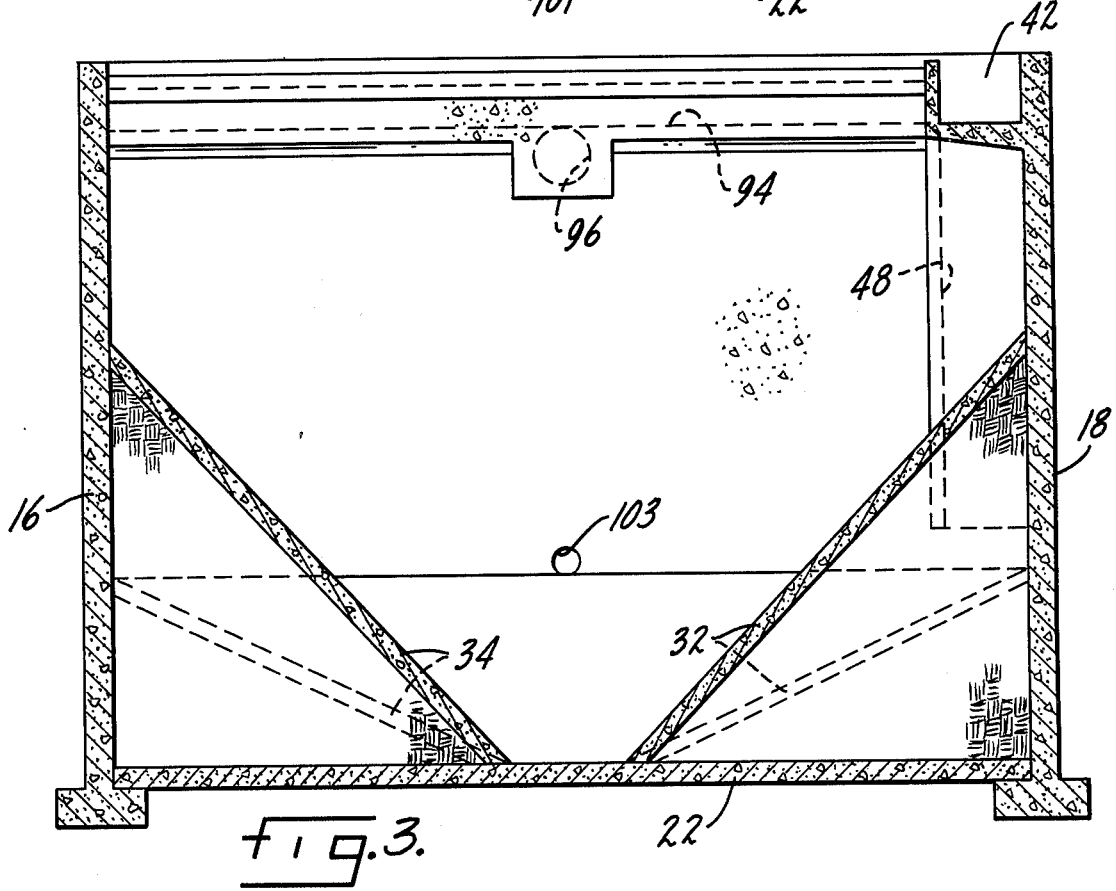

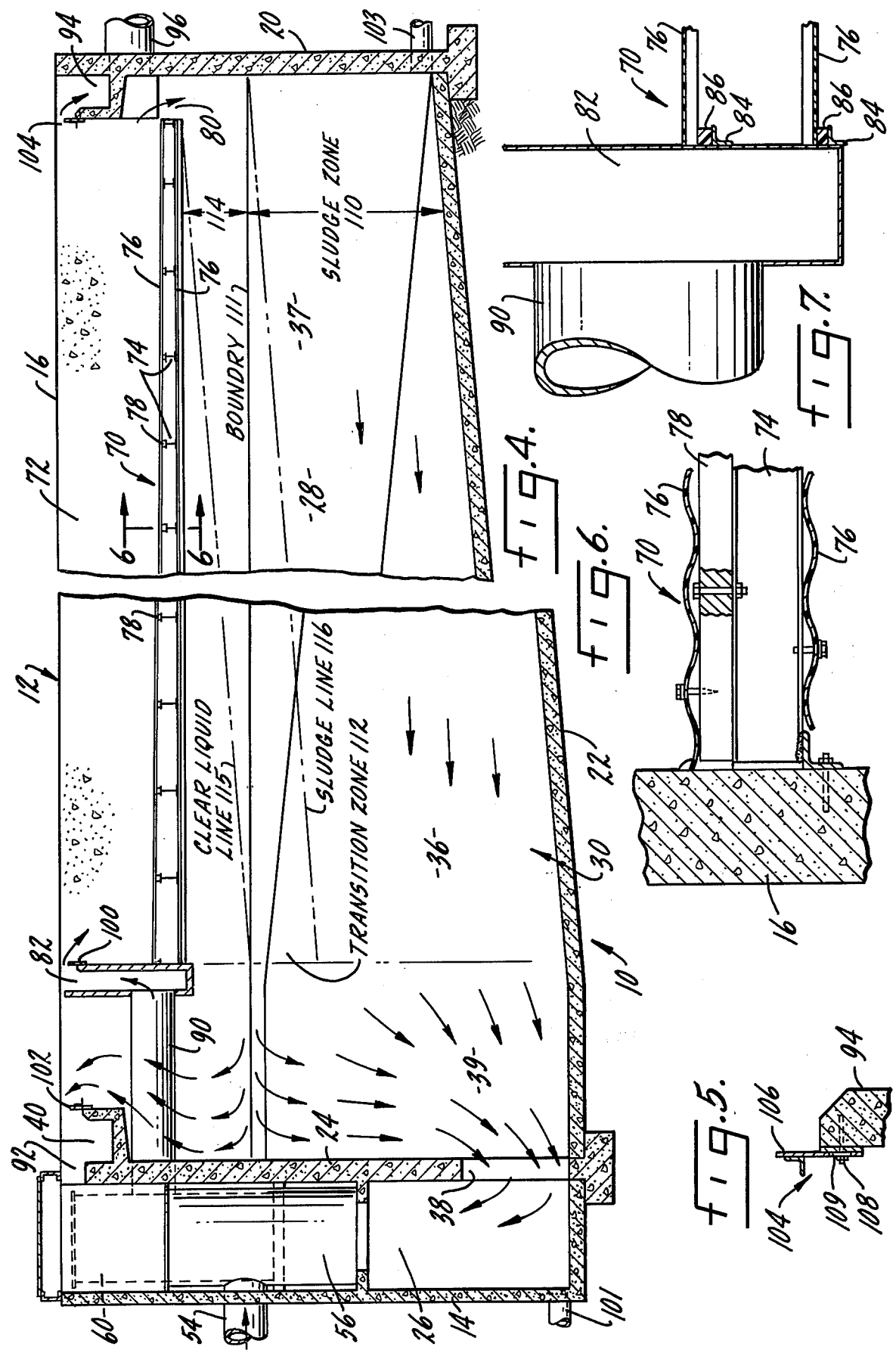

HORIZONTAL FLOW CLARIFIER

This is a continuation of application Ser. No. 347,031, filed Apr. 2, 1973, and now abandoned.

BACKGROUND AND SUMMARY OF THE INVENTION

The present invention relates to improvements in the art of separating suspending solids from liquids, and more particularly to an apparatus for purifying or clarifying liquids containing solids, contaminants, and the like.

It has been the heretofore practice in conventional horizontal clarifiers to pass liquid to be clarified through a settling zone, in which the terminal depth of clarified water at the point of collection is a function of the particle settling velocity and the upward overflow rate, to settle out the precipitates present in the liquid. The apparatus of the present invention offers a unique design which permits the liquid being clarified to travel through a settling zone having a controlled depth, along the entire length of the zone, which is a function of the particle settling velocity and the vector sum of the upward overflow rate opposed by a greater downward desludging flow rate traveling in the same direction while the precipitates are settled out. This feature permits the clarifier to attain greater flexibility in obtaining increased throughput for a given size. A more positive control and retention of the suspended or precipitated solids separated from clear effluent may also be attained with the proposed type of clarifier.

It is an object of the present invention to provide a method for removing suspended solids and the like from liquids while the liquid is flowing in a substantially horizontal direction.

It is a further object of the present invention to provide clarifier apparatus for removing suspended solids and the like from liquids which pass through the clarifier in a substantially horizontal direction.

It is another object, in accordance with the previous object, to cause the horizontal flow of liquid to define an upper free-fall layer of lower velocity and a lower sludge layer of higher velocity which approaches a point of positive separation of the clarified water above from the sludge stream below.

It is another object of the present invention to provide a horizontal flow type clarifier which provides kinetic capture of precipitates settling from an upper free-fall layer into a lower sludge layer of increasing velocity.

It is a further object of this invention to provide a horizontal flow type clarifier having a secondary clarification basin for polishing of the effluent after primary clarification.

It is yet a further object of the present invention to provide a clarifier for removing solids and the like from liquids which offers greater flexibility in obtaining increased throughout for a given size.

The above and other objects are realized in accordance with the present invention by providing a new and improved clarifier design for purifying liquids containing solids or contaminants. Briefly stated, the liquid to be purified, i.e. a liquid containing solids and the like, is fed into the clarifier apparatus of the present invention and both purified liquids and thickened solids and/or particles are produced by and discharged from the apparatus. The liquid to be treated enters the clarifier and is directed into a primary sludge contact zone where it is mixed with recirculating sludge. Chemicals may be added to the liquid in this zone to aid in the formation of precipitates. Liquid from the primary sludge contact zone is pumped via flumes to the entrance of a settling corridor for horizontal flow therethrough. The liquid flows horizontally through the corridor forming an upper free-fall zone and a lower sludge zone as the precipitates settle out. As the liquid reaches the settling corridor exit, it approaches a point of positive separation of the clarified liquid above from the sludge stream below which is formed by the kinetic capture of precipitates settling from the free-fall zone into the sludge zone of increasing velocity. The clarified liquid and the sludge stream enter a separation zone where they are caused to contact a vertical flow directing partition wall causing the sludge stream of higher velocity to pass thereunder back into the primary sludge contact zone and the clarified liquid of lower velocity to pass thereover to be boosted through flumes into a secondary settling basin for polishing. Polished liquid then flows over weirs to outlet while the sludge collected in the basin is directed to the entrance of the settling corridor.

BRIEF DESCRIPTION OF THE DRAWINGS

The invention, as to its organization, taken with further objects and advantages thereof, will best be understood by reference to the following description taken in connection with the accompanying drawings, in which:

FIG. 2 is an end elevation of the liquid treating apparatus of FIG. 1;

FIG. 3 is a sectional view of the liquid treating apparatus of FIG. 1 taken along line 3—3 of FIG. 1;

FIG. 4 is a sectional view of the liquid treating apparatus of FIG. 1 taken along line 4—4 of FIG. 1;

FIG. 5 is an elevational view of a typical adjustable weir of the type used to control liquid flow through various parts of the liquid treating apparatus of FIG. 1;

FIG. 6 is a partial sectional view taken along line 6—6 of FIG. 4 showing the construction details of the secondary settling basin floor; and FIG. 7 is a partial sectional view taken along line 7—7 of FIG. 1.

DESCRIPTION OF THE PREFERRED EMBODIMENT

Figure 1:
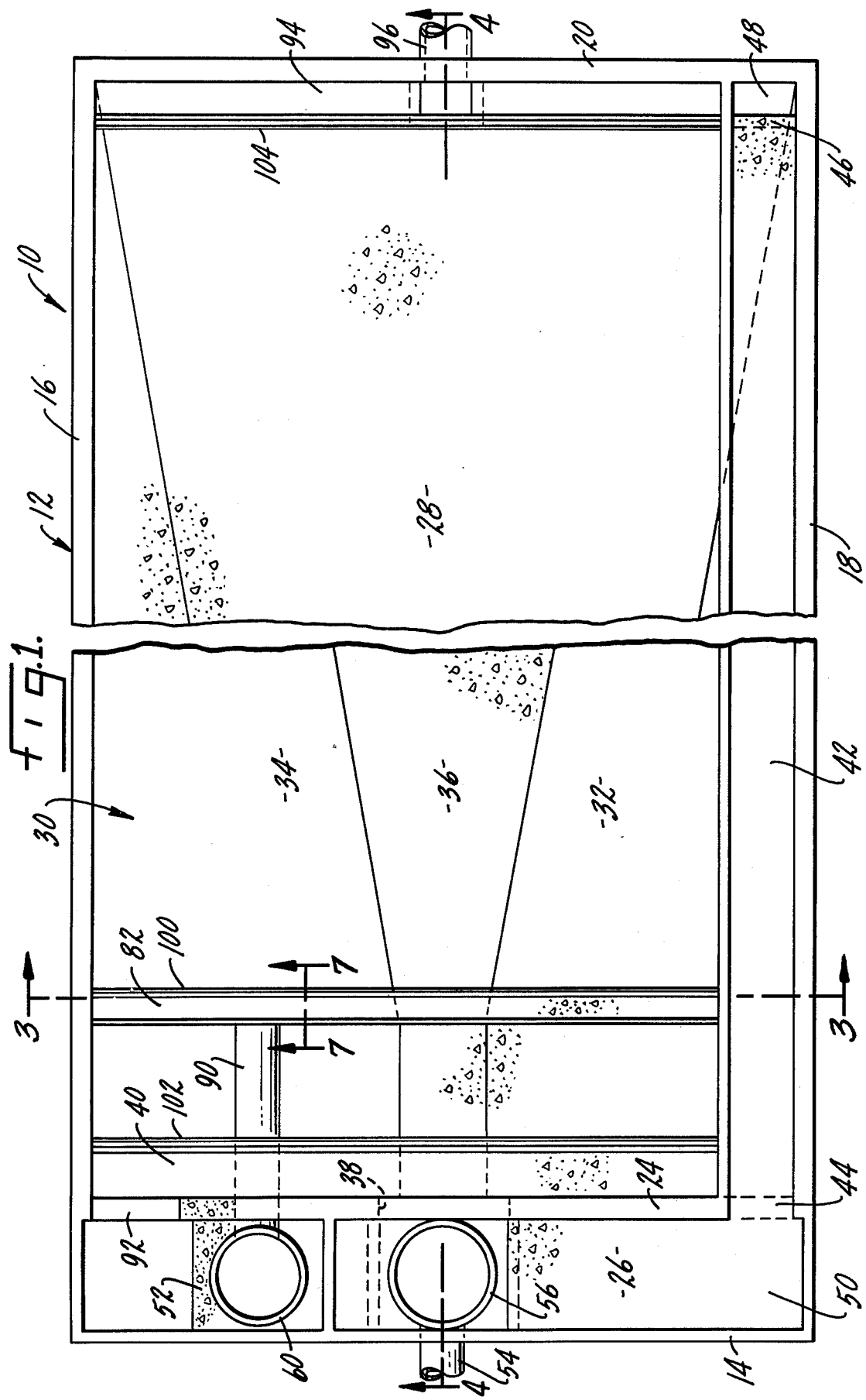
FIG. 1 is a top plan view of a liquid treating apparatus embodying the features of the present invention.

Referring now to FIGS. 1–4 there is illustrated a liquid treating apparatus, indicated generally by reference numeral 10, embodying the features of the present invention. The water treating apparatus 10 comprises a rectangular open tank 12 having side walls 14, 16, 18, and 20 and a bottom 22. A flow directing partition wall 24 divides tank 12 into a distribution compartment 26 and a settling compartment 28. A portion of bottom 22 which defines compartment 28 is inclined slightly upward in a direction away from compartment 26. Compartment 28 further includes a floor 30 defined by inclined floor sections 32 and 34 so as to define a substantially V-shaped channel 36 therebetween. Sections 32 and 34 are angled inward from the edges of wall 20 towards a central portion of partition wall 24 and downward in a direction away from partition wall 24 towards the lower edge of wall 20. The area between floor sections 32 and 34 and walls 16 and 18 is preferably filled with compacted earth fill. Channel 36 is thus a funnel shaped passageway of an increasing included angle in a direction away from partition wall 24 and of a decreasing depth in a direction away from partition wall 24.

Flow directing partition wall 24 is formed to define a sludge port 38 at a lower portion thereof, in communication with a lower portion of channel 36, and a flume 40 along the upper edge thereof, as best seen in FIG. 4. Referring to FIGS. 1 and 3, a flume or trough 42 is formed along the upper edge of wall 18 having an inlet end 44 in communication with an upper portion of compartment 26 and an outlet end 46 in communication with a downcomer 48 formed at the intersection between walls 18 and 20 in communication with channel 36.

Distribution compartment 26 is divided into a sludge contact and recirculation zone 50 and a clear liquid receiving zone 52. Recirculation zone 50 includes an inlet pipe 54 in communication with a draft tube 56 positioned therein having conventional recirculation apparatus 58 associated therewith, as best seen in FIGS. 1, 2, and 4. Zone 52 likewise includes a draft tube 60 positioned therein having conventional circulation apparatus 62 associated therewith, as best seen in FIGS. 1, 2, and 4.

A false floor 70 spanning across an upper portion of compartment 28 between walls 16 and 18, defines an elevated secondary settling basic 72 thereabove, as best seen in FIG. 4. As seen in FIGS. 6 and 7, floor 70 is constructed from a plurality of transversely extending I beams 74 covered by corrugated fiberglass sheets 76. Spacer elements 78 are sandwiched between upper sheet 76 and I beams 74. I beams 74 and elements 78 are dimensioned to cause a gradual downward slope of floor 70 in a direction towards wall 20. The outer end of floor 70 is spaced from wall 20 so as to define a sludge return port 80 therebetween. The inner end of floor 70 is secured to the lower portion of a transverse flume or trough 82 extending between the upper portions of wall 16 and flume 42, as best seen in FIG. 7. Angle brackets 84 and sealing strips 86 secure floor 70 to flume 82.

A connecting pipe of flume 90 is provided to permit the passage of liquid which enters zone 52, through a passage 92 formed in wall 24, to be recirculated through draft tube 56 into flume 82. A polished liquid collecting flume 94 extends along the upper edge of wall 20 in basin 72 to collect polished liquid from basin 72 and direct it to service through outlet pipe 96. Adjustable weirs 100, 102, and 104 are respectively provided to control the passage of liquid over flumes 82, 40, and 94, as best seen in FIG. 4. Referring to FIG. 5, weirs 100, 102, and 104 are of similar construction and include a vertical plate 106 secured to the flume wall by a bolt 108 passing through a vertically elongated slot 109 in plate 106. Relative movement of bolts 108 within slots 109 permits vertical adjustment of the weirs. Drain pipes 101 and 103 are respectively provided to drain compartments 26 and 28.

The liquid to be treated enters the clarifying apparatus 10 through inlet pipe 54 into recirculation zone 50. This liquid is mixed with the return sludge within zone 50 and is lifted through draft tube 56 via recirculation apparatus 58 into flume 42. Chemicals may be added into zone 50 to aid in the formation of precipitates. The liquid from flume 42 is directed through downcomer 48 into the entrance of a horizontal flow corridor 37 defined by the area below floor 70 plus the area of channel 36. The liquid flows through corridor 37 in a substantially horizontal direction defining a sludge zone 110 below the boundary streamline 111 and a free-fall zone 114 above the boundary streamline 111. A transition zone 112 is defined between the clear liquid line 115 and the sludge line 116. As the solid particles settle from the free-fall zone 114 through the transition zone 112, they are captured into the sludge zone as they fall below the boundary streamline 111. By the time the liquid exits corridor 37 and enters separating zone 39, a distinct separation of a clear liquid stream above the boundary streamline 111 and a sludge stream below the boundary streamline is present. The sludge stream is directed through sludge port 38, formed through wall 24, into sludge contact zone 50 to be mixed with inlet liquid and recirculated back through corridor 37 via flume 42. The clear liquid stream passes over weir 102 into flume 40 and through passage 92 into zone 52.

The clear liquid from zone 52 is lifted into draft tube 60 by circulation apparatus 62 and directed through pipe 90 into flume 82. The clear liquid then passes over weir 100 into elevated basic 72 for final polishing. As the liquid flows through basic 72 solids still suspended therein are settled out and re-enter corridor 37 via sludge return port 80. The polished liquid passes over weir 104 into flume 94 and leaves clarifying apparatus 10 to service through pipe 96. The arrows in FIG. 4 indicate the general directions of liquid flow.

An important part of the present invention is establishing a flow rate relationship between the flow over weir 102 and the flow through sludge port 38. By establishing a greater flow rate of the sludge stream through port 38 than the flow rate of the clear liquid stream over weir 102, a point of positive separation of the clear liquid stream above the sludge stream therebelow is approached. Also, this flow rate relationship results in a kinetic capture of solid particles from the free-fall layer into the sludge layer of increased velocity. The relative flow rates of the sludge stream and clear water stream are controlled by the adjustment of weirs 102, 100, and 104 and the flow rate through inlet pipe 54. Adjustment of weir 102 controls the flow rate of clear liquid leaving separating zone 39 into flume 40. Adjustment of weir 100 controls the flow rate of clear liquid leaving flume 82 into basic 72. The adjustment of weir 104 controls the flow rate of polished liquid leaving basic 72 into flume 94 to be directed to service via outlet pipe 96.

For purposes of an example, a clarifier assembly constructed in accordance with the present invention, designed to delivery 3 million gallons per day, has an inlet flow rate through pipe 54 of 280 cfm and an outlet flow rate through pipe 96 of 280 cfm. The flow rate through flume 42 and downcomer 48 into corridor 37 is 1,120 cfm and the flow rate from sludge return port 80 into corridor 37 is 140 cfm; making the total flow rate through corridor 37 at 1,260 cfm. The flow rate of the sludge stream leaving separation zone 39 via sludge port 38 into sludge contact zone 50 is 840 cfm and the flow rate of the clear liquid stream leaving separation zone 39 over weir 102 into zone 52 via flume 40 and passage 92 is 420 cfm. The flow rate of clear liquid from zone 52 which passes through pipe 90 into flume 82 and over weir 100 into basin 72 is also 420 cfm. Polished liquid is removed to service over weir 104 into flume 94 and out pipe 96 at a flow rate of 280 cfm and the sludge from basin 72 is returned to corridor 37 via port 80 at a flow rate of 140 cfm. The flow of the sludge layer at approximately twice the rates of the flow of the free-fall layer within corridor 37 results in the kinetic capture of solid particles from the free-fall layer into the sludge layer and also causes a point of positive separation of the clear liquid stream over the sludge stream within separation zone 39.

While the embodiment described herein is at present considered to be preferred, it is understood that various modifications and improvements may be made therein, and it is intended to cover in the appended claims all such modifications and improvements as fall within the true spirit and scope of the invention.

What is claimed is:

1. Apparatus for separating suspended solids from liquids, comprising: a tank, a horizontally elongated settling corridor defined within said tank for directing liquid therethrough in a substantially horizontal flow direction so as to define an upper free-fall settling zone and a lower sludge zone; a liquid entrance at one end of the settling corridor; a sludge contact zone defined within said tank for receiving liquid entering said tank; a secondary settling basin; a substantially vertical partition wall positioned in facing relationship to the liquid exiting from said settling corridor, said partition wall being positioned so as to define a passageway therebelow to receive the liquid from the sludge zone leaving said corridor and a passageway thereabove to receive liquid from the free-fall zone leaving said corridor; means associated with said partition wall for causing the horizontal flow rate of liquid in said sludge zone to be greater than the horizontal flow rate of liquid in said free-fall zone so as to cause a kinetic capture of solids settling from the free-fall zone into the sludge zone; said secondary settling basic having outlet means to direct liquid to service; and said sludge contact zone having sludge return means for directing liquid therefrom through said entrance and into said settling corridor.

2. The invention as defined in claim 1 wherein said secondary settling basin is defined within an upper portion of said tank so as to define said settling corridor immediately therebelow.

3. The invention as defined in claim 1 wherein the upper portion of said partition wall includes adjustable weir means associated therewith so as to permit adjustment of the relative flow rates of said free-fall zone and said sludge zone to cause kinetic capture of solids settling from said free-fall zone into said sludge zone.

4. The invention as defined in claim 1 wherein said partition wall partially defines said sludge contact zone therebehind for receiving the liquid from said sludge zone which passes below said partition wall.

5. The invention as defined in claim 4 further including inlet pipe means associated with said sludge contact zone for directing liquid thereinto.

6. The invention as defined in claim 5 wherein recirculator means is provided within said sludge contact zone for directing liquid contained therein through a connecting flume into the entrance of said settling corridor.

7. The invention as defined in claim 4 wherein said partition wall partially defines a chamber therebehind for receiving the liquid from said free-fall zone which passes over said partition wall.

8. The invention as defined in claim 7 wherein said partition wall has adjustable weir means associated with an upper portion thereof so as to permit adjustment of the relative flow rate of said free-fall zone and said sludge zone to cause kinetic capture of solids settling from said free-fall layer into said sludge layer.

9. The invention as defined in claim 7 wherein said chamber includes circulator means for directing liquid from said chamber into said secondary settling basin.

10. The invention as defined in claim 9 wherein the liquid from said chamber passes through turn around flumes before entering said settling basin.

11. The invention as defined in claim 1 wherein said outlet means communicates with an upper portion of said secondary settling basin and a sludge port is defined in a lower portion of said secondary settling basin for directing sludge back into said settling corridor adjacent the entrance thereof.

* * * * *

UNITED STATES PATENT AND TRADEMARK OFFICE
CERTIFICATE OF CORRECTION

PATENT NO. : 3,940,337
DATED : February 24, 1976
INVENTOR(S) : Herbert D. Robison It is certified that error appears in the above-identified patent and that said Letters Patent are hereby corrected as shown below:

In column 1, line 58 delete "throughout" and insert
--throughput--.

In column 3, line 27 delete "basic" and insert --basin--.

In column 4, lines 21,22,44 & 46 delete "basic" and insert
--basin--.

In column 4, line 50 delete "delivery" and insert --deliver--.

In column 6, line 30 delete "circulator" and insert
--circulation--.

Signed and Sealed this eighteenth Day of May 1976

[SEAL]

Attest:

RUTH C. MASON
Attesting Officer

C. MARSHALL DANN
Commissioner of Patents and Trademarks